United States Patent
Purdum et al.

(10) Patent No.: US 7,256,320 B2
(45) Date of Patent: Aug. 14, 2007

(54) METHOD FOR DEFEAT OF BULK CHEMICAL WARFARE AGENTS

(75) Inventors: William R. Purdum, Maryland Heights, MO (US); Charles W. Martin, Ellisville, MO (US); Jeffry Golden, Creve Coeur, MO (US)

(73) Assignee: Clean Earth Technologies, LLC, St. Louis, MO (US)

( * ) Notice: Subject to any disclaimer, the term of this patent is extended or adjusted under 35 U.S.C. 154(b) by 0 days.

(21) Appl. No.: 11/102,950

(22) Filed: Apr. 11, 2005

(65) Prior Publication Data

US 2007/0135671 A1    Jun. 14, 2007

Related U.S. Application Data

(60) Provisional application No. 60/560,925, filed on Apr. 9, 2004.

(51) Int. Cl.
*F42B 33/06* (2006.01)
*A62D 3/00* (2006.01)
*A62D 101/02* (2006.01)

(52) U.S. Cl. .................................... 588/249.5
(58) Field of Classification Search ............... 588/299, 588/249.5, 252, 255, 256, 261, 401
See application file for complete search history.

(56) References Cited

U.S. PATENT DOCUMENTS

| | | | | |
|---|---|---|---|---|
| 2,053,882 A | * | 9/1936 | Vaughan | 30/308.1 |
| 3,486,330 A | * | 12/1969 | Edman | 60/39.47 |
| 4,046,055 A | * | 9/1977 | McDanolds et al. | 86/50 |
| 4,474,915 A | * | 10/1984 | Grinacoff | 524/111 |
| 4,783,354 A | * | 11/1988 | Fagan | 428/40.5 |
| 5,183,708 A | | 2/1993 | Yoshida et al. | |
| 5,301,594 A | * | 4/1994 | Argazzi et al. | 86/50 |
| 5,907,110 A | | 5/1999 | Garcia et al. | |
| 5,998,691 A | * | 12/1999 | Abel et al. | 149/124 |
| 6,132,356 A | * | 10/2000 | Schabdach et al. | 588/260 |
| 6,293,163 B1 | * | 9/2001 | Johnston et al. | 73/864.74 |
| 6,854,345 B2 | | 2/2005 | Alves et al. | |
| 6,978,708 B1 | * | 12/2005 | Blankenship | 86/50 |

FOREIGN PATENT DOCUMENTS

DE   4114560 A  *  11/1992
GB   2294923 A  *  5/1996

OTHER PUBLICATIONS

Chemindustry.com "Fumed Silica Chemical Information" http://www.chemindustry.com/chemicals/725495.html. Jul. 13, 2006.*

* cited by examiner

*Primary Examiner*—John Kreck
(74) *Attorney, Agent, or Firm*—Husch & Eppenberger LLC; Grant D. Kang

(57) ABSTRACT

A method for immobilizing at least one hazardous chemical, comprising the steps of breaching a container having a bulk chemical agent, adding a rheological modifier into the container, and dispersing the rheological modifier within the container so as to promote interaction between the rheological modifier and the bulk chemical agent.

5 Claims, 2 Drawing Sheets

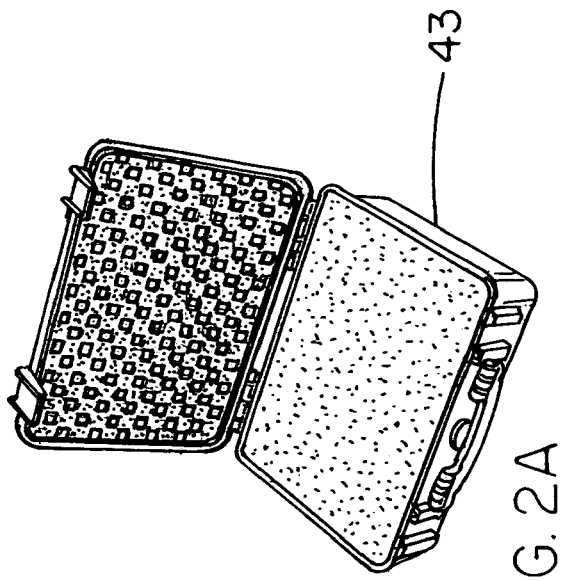
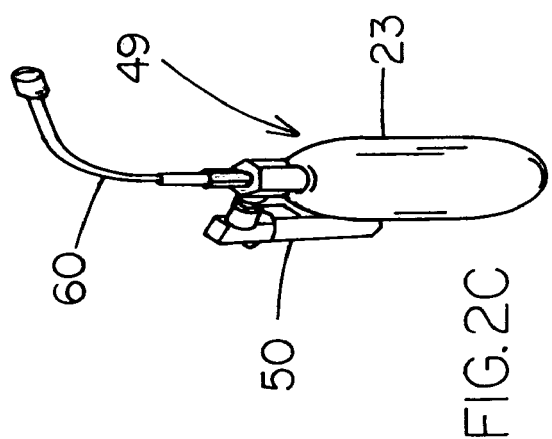
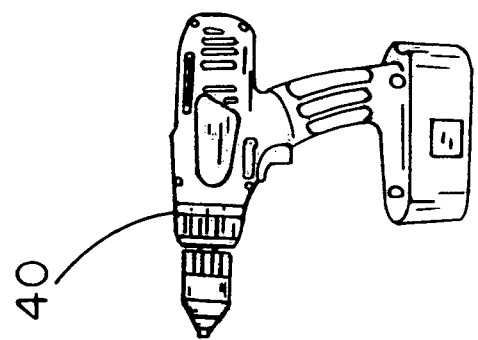
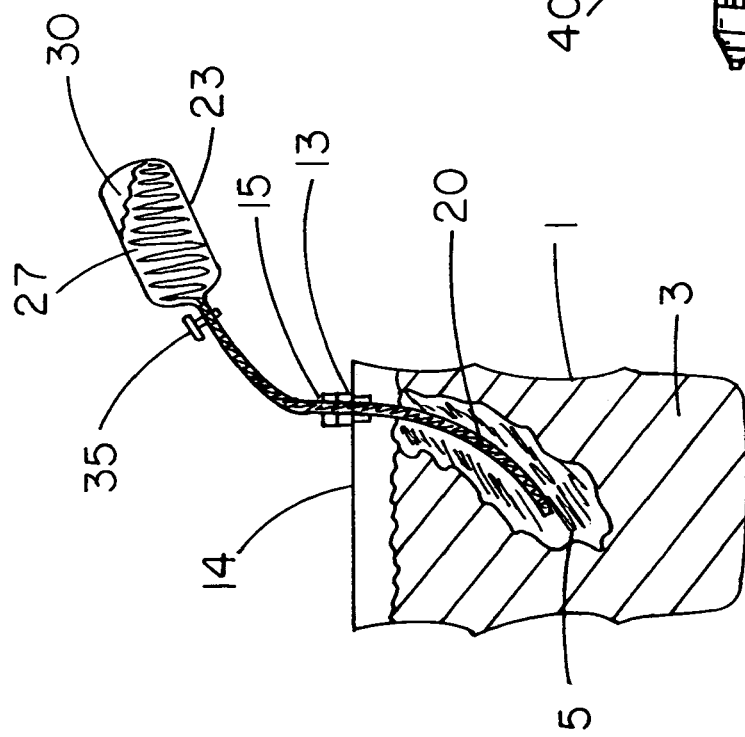

METHOD FOR DEFEAT OF BULK CHEMICAL WARFARE AGENTS

CROSS-REFERENCE TO RELATED APPLICATIONS

This application claims the benefit of U.S. Provisional Application No. 60/560,925, filed Apr. 9, 2004.

BACKGROUND OF THE INVENTION

1. Field of the Invention

This invention relates generally to method to defeat chemical warfare agents and other hazardous materials, and, more particularly, to a method and device for defeating bulk chemical warfare agents and other hazardous materials, such as those stored in a large drum or other container, by rendering them essentially useless and difficult to remove from a container.

2. Related Art

Chemical warfare agents and many toxic industrial chemicals (TICs), i.e., hazardous materials, that might be used as weapons are typically non-aqueous, i.e., organic compounds. In certain circumstances it may be desired to immobilize such materials in a container so that they can be safely transported or to defeat their use as weapons. In some situations, the container may be an integrated part of an industrial plant or it may be a stand-alone container, e.g., a drum, which cannot be safely opened except in a specially equipped hazardous material facility. In such circumstances, special means and steps must be taken so that the agents can be altered and rendered useless or neutralized.

Denying the utility of bulk or production quantities of chemical warfare agents and/or toxic industrial chemicals by a fast-acting, lightweight system for rendering the materials useless or undeliverable has generally used the approach of chemically neutralizing the agent or TIC. This may render the agent relatively safe to handle or dispose, but it usually requires a stoichiometric ratio of decontaminant or neutralizer to agent that is greater than one. For example, one or more decontaminant molecule is required to destroy or neutralize an agent molecule. Some types of decontamination have involved the use of absorbent materials. Some of these employ reactive chemical decontaminants to neutralize the agent. However, absorbent decontaminants in the prior art do not offer an efficient or low bulk means of immobilizing bulk agent.

Several thickeners have been used in the prior art for increasing the viscosity of chemicals for industrial purposes and for chemical warfare agents. Some are also used as absorbent barriers for protection from hazardous chemicals, which may include chemical agents. Such materials, however, are not readily dispersed within a container. Although they may absorb the agent, they do not generally imbibe the agent so that it is not readily released, for example by compression.

Cross-linked copolymers have been shown to be effective in the immobilization of hazardous materials by forming super-thickened gels or solid-like materials. However, the introduction of these materials into containers and their effective use to defeat bulk chemical agents without specific knowledge of the agent characteristics has not been previously addressed. Moreover, their direct use for the defeat of bulk quantities of already 'thickened agent' is not effective, because they cannot be readily dispersed.

Several means for breaching a closed container of hazardous material are known. These permit a tubulation or other hollow penetration of a container wall without the unwanted release of hazardous material from within the container. However, these devices do not allow for a simple and low cost means to insert material and mix it.

Although the chemical warfare agents of interest may span a multitude of variants such as organo-phosphorous compounds, which include G-type nerve agents and V-type nerve agents, and non-traditional agents, vesicants, blood agents, choking agents and/or incapacitating agents, a method is needed to render the targeted materials useless regardless of the type of chemical composition or chemical functionalities. To accomplish this objective, the method must be able to incapacitate the targeted materials without creating a new hazard in the process, either to personnel or the environment.

Several of the presently inventoried decontamination technologies are based on an aqueous decontaminant formulation, which may be fine for attacking lower, but still lethal concentrations or quantities of chemical warfare agents and rendering them useless. However, for dealing with bulk chemical warfare agents such as batch process preparations that may be stored in concentrated or 'neat' form and in quantities which comprise from one to hundreds of liters, these technologies are not viable solutions for a covert defeat. Part of the unsuitability of decontaminant to bulk agent defeat derives from unfavorable stoichiometric requirements. This is especially true for existing aqueous-based technologies, where extremely large quantities of decontamination materials may be required for bulk agent degradation. Also, a substantial amount of support equipment may be needed. Comparison can also be made to those processes that have been previously evaluated, and some employed, for destroying large caches of chemical agents as part of the stockpile and non-stockpile agent demilitarization programs. These processes include wet air oxidation, supercritical water oxidation, controlled hazardous material incinerations, and several others. All of these physical approaches require sophisticated equipment, substantial amounts of materials and/or energy, and are not particularly amenable to unattended operation.

A fast-acting, lightweight system that chemically attacks and neutralizes or destroys any chemical functionality of interest may be an insurmountable task because nearly all chemical warfare agents are organic molecules, which typically possess any of a myriad of different functionalities with significantly different reaction kinetics and susceptibilities to decontamination technology. An additional factor to consider entails the degree of sophistication in the preparation techniques and purity of the chemical agent of interest. Even though the known stockpiles of chemical agents are comprised primarily of 'neat' agents with added stabilizers, the clandestine compositions are expected to be less pure. Their manufacture will likely involve fewer expensive purification steps, and they may be stored in inert organic solvents as protection from unwanted aqueous degradation. A similar argument applies to several of the toxic industrial chemicals (TICs) that are identified as potential chemical weapons, such as those on government compiled lists such as the ITF-25 and ITF-40 lists, many of which are inorganic chemicals.

SUMMARY OF THE INVENTION

In one embodiment the invention is a method for immobilizing at least one hazardous chemical, comprising the steps of breaching a container having a bulk chemical agent, adding a rheological modifier into the container, and dispersing the rheological modifier within the container so as to promote interaction between the rheological modifier and the bulk chemical agent.

In another embodiment the invention is a kit for immobilizing a bulk chemical agent stored in a container, wherein the kit comprises a breaching tool for penetrating the container; at least one sealing device for preventing leakage of the bulk chemical agent from the container during or after breaching; a container for storing a rheological modifier; and a tubulation for delivering the rheological modifier, the tubulation having two ends, wherein a first end is attached to the container for storing rheological modifier and a second end is designed to be inserted through the sealing device to gain access to the bulk chemical agent.

In yet another embodiment the invention comprises a kit for immobilizing a bulk chemical agent stored in a container, wherein the kit comprises a breaching tool for penetrating the container; at least one sealing device for preventing leakage of the bulk chemical agent from the container during or after breaching; a container for storing a rheological modifier, wherein the rheological modifier comprises at least one of: fumed silica (FS), polyethylenimine (PEI), crosslinked styrene/butadiene copolymer (SBC1); a tubulation for delivering the rheological modifier, the tubulation having two ends, wherein a first end is attached to the container for storing rheological modifier and a second end is designed to be inserted through the sealing device to gain access to the bulk chemical agent; and a portable, lightweight case for holding the kit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a schematic diagram of a method for bulk agent defeat;

FIG. 2 shows components of a Bulk Agent Defeat Kit;

DETAILED DESCRIPTION OF THE PREFERRED EMBODIMENTS

Figure 3B:
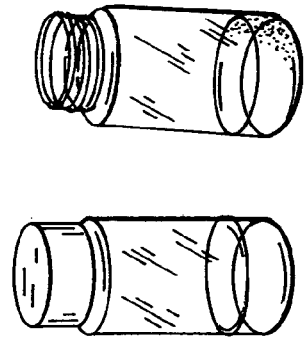
FIG. 3 shows a demonstration of rheological modification with styrene/butadiene copolymer beads in methyl salicylate.

The following description of the preferred embodiment(s) is merely exemplary in nature and is in no way intended to limit the invention, its application, or uses.

Absorbent materials are widely used to stabilize or solidify hazardous chemicals. Among the many absorbent materials, there are some which capture the hazardous materials so that the subsequent release is very difficult except by intensive thermal or chemical processing. Cross linked styrene/butadiene copolymer (SBC1) and fumed silica (FS) are two such materials. These are available as small beads and have the potential to be produced as microparticles and perhaps even nanoparticles. In contrast, linear polymer materials (e.g., NOCHAR) may be excellent absorbents, but the absorption may be easily reversed. In the case of FS beads, which are used in chromatographic column applications, reactive modifiers can be appended to the beads so that the some destruction of the chemical warfare agent can be obtained in conjunction with the rheological change. An example is the attachment of hydroxyl or aliphatic molecules with hydroxyl onto the FS beads.

There are some specific concepts in the application of these rheological modifiers (RMs). The use of SBC1 and FS beads together may offer advantages in treating a wider range of agents than one type of RM alone. To address thickened agent, an organic solvent, perhaps with FS beads, can reduce the viscosity of thickened agent so that FS beads and/or SBC1 beads can be injected. In this way, the thickened agent is 'thinned' and then 'solidified'.

Although several classes of RMs do not require substantial mixing and dispersion inside the chemical warfare agent container for unthickened agent, there are still advantages to injecting in a manner that assists the transport and solidification of the maximum volume of bulk agent for a given mass of RM. In spite of several devices for sampling and access into containers of hazardous materials ("hazmat"), there is a need for devices for obtaining some mixing or for optimally inserting the RM into the bulk agent.

The method of defeat of the bulk agent 3 within a closed container 1 comprises the following steps (FIG. 1). On an accessible place on the container 14, the container 1 is breached by a tool 13 that forms a seal with a removable plug or septum 15. A tubulation 20 is inserted through the removable plug, sliding seal, or septum of the breaching tool and put partially into the bulk of the agent 3. Connected to the tubulation is a pressurized container 23 of RM. As the tubulation is made to further penetrate the agent 3, the valve or flow control 35 of the pressurized container is opened so that the volume 27 of RM 5 is introduced into the volume of agent 3. In this manner, the RM 5 is spread into the bulk agent 3. Prior to the pressurized gas 30 in the pressurized container 23 being introduced into the container of bulk agent 1 (as would happen, for example, when pressurized container 23 is completely emptied of its contents), valve 35 is closed to avoid pressurization of container 1. Then, pressurized container 23 and tubulation 20 are rotated to create a stirring motion with tubulation 20 and as convenient, tubulation 20 is further inserted into container 1 to better effect dispersal and mixing. In instances involving relatively low viscosity agents and TICs, substantial mixing and dispersion by these external means are not needed because the RM will migrate and diffuse in these materials.

Versions of a kit for bulk agent defeat can be tailored for specific situations. The following is an example of a self-contained, portable kit for a covert small (20 Liter) batch, in process, or bulk chemical agent defeat (FIG. 2). The kit comprises an attaché case-like container 43 for the components of the kit, an applicator with a pressurized tank 49, tools for actuating the breaching tool 40, the breaching tool, and additional pressurized tanks of RM.

Tools for actuating the breaching tool 40 include, in one embodiment, a battery powered electric drill (FIG. 2). The actual breaching tool may be a drill bit. The drill bit may have a special cutting point or be made from a special material, such as being carbide- or diamond-tipped or titanium nitride-coated, in order to penetrate a variety of material types. Use of such a drill in conjunction with a sealing device 13 as in FIG. 1 allows penetration of bulk container 1 without release of hazardous material or bulk agent 3. In an embodiment where the breaching tool is a drill bit, the drill bit may also be of special design such as being hollow with a frangible or thin metal seal so that it can be punctured during the attachment of the RM injection device.

FIG. 2 shows pressurized tank 49, which consists of pressurized container 23, a handle 50 with a control valve, and an exit tube 60. Handle 50 may also contain an optional pressurized gas cylinder which would pressurize the main container 23, thereby forcing material from exit tube 60.

There are many ways to make holes in containers and for injection, but the need to seal the bulk agent container upon breaching or to prevent fumes or liquid from escaping is crucial if persons not wearing adequate personal protective gear are present. For most of the chemical warfare agents and TICs, even low concentrations of aerosols, vapor or gas can cause serious injury.

The invention employs an RM-based gel formation, polymerization, or solidification. Application of these types of physical changes are expected to lead to conversion of a chemical agent to a very high viscosity or semi-solid state since the chemical agents are typically stored as neat liquid materials in a non-aqueous environment. When the RM is introduced, reactions occur that can lead to local degradation of the agent with subsequent formation of a gel, polymer, or solid.

Mass transfer, stoichiometry, and reaction rates are critical issues because a practical quantity of rheology modifier must treat a quantity of agent that is 'mission significant'. Mass transfer is an issue, since many chemical agents are of moderate viscosity, e.g. VX is comparable to motor oil, so that a mixing or dispersion mechanism must be included in the use of RMs. This is also true for potentially thickened agents, such as GD or HD, and/or a dusty agent like dusty-HD. Stoichiometry is an issue so that only a small amount of RM is needed. As will be demonstrated in later examples, keeping the stoichiometric requirements (on a mole basis) between RMs and the agents as low as possible, i.e. <1 to 3–5, will insure that the amount of RM necessary for rendering an agent useless is minimal. Reaction rate (kinetics) is important so that the mission can be accomplished in a timely manner.

Conceptually, a representative rheological-modifier system will consist of two components: component one is a delivery cylinder or a small friable projectile cartridge containing the rheological materials; component two is an injection device for the forcible insertion of the chemical contents of the cylinder or cartridges into the bulk liquid phase of the chemical warfare agent (CWA) or toxic industrial chemical (TIC). When injected into the containment vessel of a CWA or TIC, a multi-point source chemical reaction is initiated resulting in irreversible rheological changes to the bulk liquid phase. This occurs as a consequence of the reaction of low molecular weight basic and nucleophilic reactants on the active reactive sites of the selected chemical agents. This reactivity concept and the stoichiometric requirements, as a ratio in terms of grammoles for a potential rheological material with a selected simulant for a chemical warfare agent, is illustrated with the following:

The scenario involves a small 20 liter containment vessel with approximately 15 liters of 2-(chloroethyl) ethyl sulfide (CEES, half mustard) leaving 5 liters of vessel head space, located in a small, perhaps clandestine pilot plant setting. The chemical agent simulant, CEES, has a formula weight of 124 amu. (atomic mass units), bulk density of 1.070 kg/l, concentration of 8.6 gram moles/l, occupying a volume of 15 l, resulting in a total mass of 129 gram moles (i.e. 8.6 gram moles/liter×15 liters=129 gram moles).

A representative chemical rheological modifier is Fumed Silica (FS). This can be packaged in a 1-liter cartridge for injection into a 20 l container. With a ratio of 15:1 to 25:1 of CEES to FS, an indication of the stoichiometric requirements necessary to introduce the rheological changes for this 15 liters of CEES can be determined. Another attractive rheological material that has several reactive centers is aqueous polyethylenimine (PEI) as detailed next.

The chemical structure features three (3) amine groups which offer high reactivity and stoichiometric efficiency, FIG. 1. The mole ratio of PEI to CEES for introducing rheological changes related to the stoichiometric requirements in this case is 1:3.1. This ratio approaches 1 depending upon the number of reactive sites within the PEI, such as the primary, secondary and tertiary amine centers.

Synthesis of Poly-ethylenimine $$\underset{H}{\overset{\diagdown\diagup}{N}} \text{Ethylene imine} \xrightarrow{\text{Catalyst}} \text{PEI}$$

$$H_2N-(CH_2CH_2N)_x-(CH_2CH_2NH)_y-$$
$$|$$
$$CH_2CH_2NH_2$$

Tertiary amines, 25%
Secondary amines, 50%
Primary amines, 25%

M. Hubbe

A third material that is capable of inducing the desired rheological changes is anhydrous ammonia. This compound, in combination also reacts with the gaseous agents, Sarin (GB) and the volatile TICs. The ammonia reacts to replace fluorine and produces salts or viscous phosphoro-amidates. The mole ratio of ammonia to CEES as an assessment of the stoichiometric requirement in this case is 1:3.2.

The chemical reactivity of these modifying agents when injected into 15 liters of liquid phase CEES simulant may be estimated by considering the stoichiometric mole ratios of these three potential rheological reagents. In order to render the chemical simulant CEES unusable and non-deliverable, only a partial reaction of less than 10 percent of the available mass may be required for participation in the thickening reaction. This requirement can easily be accomplished by multi-point injection of the rheological modifier.

Minimal mixing on multiple forcible point injections will create reactive centers that will radiate by diffusion and convection into the CEES liquid phase resulting in an increase in the viscosity of the mixture. The bulk of the CEES liquid phase may also act as an insulating barrier to adsorb the heat of reaction and control the thermal excursions that can cause uncontrolled volume expansion in the containment vessel.

In the case of polyethylenimine, PEI, it will react in a similar manner as the triethylenediamine component of decontaminating agent DS-2. However, as each reactive amine site enters into a neutralizing reaction resulting from nucleophilic attack, the agent will become covalently attached to the PEI polymer chain, thereby decreasing diffusion, convection, and solubility as the molecular weight of the polymer trap increases. In the case of anhydrous ammonia, reaction with CEES is expected to cause an intermolecular polymerization reaction to occur thereby decreasing solubility and resulting in increased thickening of the agent mixture.

With the majority of the TICs on the ITF-25 (International Task Force-25) and ITF-40 lists being inorganic materials with significant volatilities and susceptibility to hydrolysis, the same approach will also work.

Extending this representative example to a toxic industrial chemical (TIC), such as bulk isocyanate monomer utilized in the manufacture of urethane plastics, injection of the above rheological modifier reagents or other aqueous amines could render the bulk materials useless and non deliverable.

Conceptually, kits would be deployed in a small, lightweight Pelican®-type case. A kit may have space for three replaceable cylinder cartridges and the cartridge injector device; in another version, it may have space for approximately twenty replaceable projectiles and the projectile delivery device. A tool kit with sealing cells and drill equipment to breach pressurized containers or hard seal containment vessels will be included as a standard part of the kit. A small specialized portable battery-equipped tool kit will be included for penetrating containers without releasing harmful vapors. Depending on mission requirements, selective cartridges or projectiles can be stocked from a supply inventory into the transport case. The portable case is estimated to be about 1280 in$^3$ volume (the volume of a briefcase or backpack). The same case can be adapted for transport of additional cartridges or projectiles.

The proposed RM kit is designed as a portable, lightweight, fast-acting device which will render useless chemical agents and toxic industrial chemicals. It is independent of the specific identity of the chemicals of threat in order to deny their utility. Incorporation of the rheological-modifier reagents into compact, portable, sealed cartridge and/or projectile forms protects the integrity of the chemical reagents until their field application. Operationally, it is planned that the kit will contain a mechanical device capable of breaching any material of containment, and is equipped with features for negating any blowback to the operator while vessel penetration is in progress. Once breakthrough is completed, the mechanical component can be removed and interchanged with the injection device without removal of the penetrating probe. The RMs are introduced to the vessel, the injection device is removed, and the resulting hole is plugged. With the self-contained, compartmentalized nature of the delivery device and the inherent safety features, the potential for personnel exposure is minimized. By keeping the mass-to-volume ratio low for the chemical transformation to occur, the proposed defeat device is designed to be man-portable by one person with minimum utility requirements and will have refillable capability of consumables from bulk storage. As with any counter-measure, the chemical agent defeat kit will be capable of handling compromised environments, i.e. dirty or "thickened" agents, interferences, and open or sealed containers.

For larger scale operations, where time may not be of the essence, introduction of the RM via the sight-glass fixture or flanged entry port of a vessel head is feasible and can be accomplished in a similar manner.

The candidate rheological materials have excellent chemical stability in large quantity bulk storage and are expected to exhibit the same stability in a small cartridge. The cartridge packaging permits safe handling and safe storage of the caustic reagent chemicals, while it protects the user from inadvertent personal contact. As part of this family of chemicals, silicates have a long history of use for the agglomeration of diverse materials from paint to petroleum products. In agglomeration reactions, the reactive silicates facilitate chemical changes defined as hydration/dehydration, gelation, precipitation, and surface charge modification. These chemical changes allow silicates to act as film formers, matrix binders, and binders to the materials being agglomerated. Gelation and crosslinking polymerization reactions occur rapidly when the pH of the liquid silicate falls below pH 10.7. Silicates may be combined with additives such as fly ash, trace metal salts or even surfactants to enhance agglomerization performance. Surfactants will lower surface tension so that interaction and mixing with organic liquid phases is enhanced for added performance. The liquid silicates which make up one of the main active ingredients of the kit are reasonably priced, readily available in bulk commercial quantities, and exhibit high purity, chemical stability, and friendly environmental impact.

The individualized unit cartridge and injector delivery system is scalable to the size of a wide range of targets, one to several hundred liters. Injection of multiple cartridges of reagent can accomplish agglomeration of increased levels of threat material. Initially, efforts will focus on defeating the bulk products arising from small scale clandestine pilot production laboratory facilities. The basic bulk chemical defeat kit contains three cartridges as well as the injector device. The footprint for the kit will be the size of a small Pelican®-type case and portable for transport by a single person.

Table I below presents results of testing exemplary embodiments of the invention. Tests were made with several RMs and with several simulants. The chemical agent simulants tested included (2-chloroethyl)ethyl sulfide (CEES), thiodiglycol (TDG), di-n-butyl sulfide (NBS), and di-n-propyl sulfide (NPS) for HD, Malathion (50% solution in xylene) as a VX simulant, and methyl salicylate (MS) as the representative decontamination training stimulant. The ratio listed in Table I is that of simulant to RM.

Examination of Table 1 reveals that several of the RMs exhibit acceptable properties with gel or solid formation in less than five (5) minutes. Note: these results were obtained from non-agitated, no physical mixing/shaking treatments. It is seen that SBC1 and FS achieve solidification of very viscous gels at agent/RM ratios of 20 or more. Furthermore, it is seen that a 50% solution of Malathion and xylene can be solidified. It should be noted that an approximately 5% to 10% solution has sufficiently low viscosity so that SBC1 or FS can be readily added.

Figure 3A:
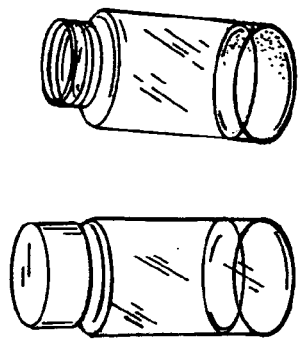
Figure 3D:
Figure 3C:
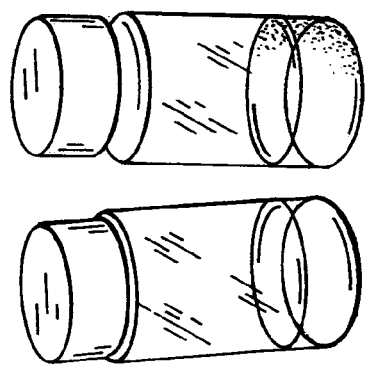

FIG. 3 shows a demonstration of rheological modification with styrene/butadiene copolymer beads in methyl salicylate. In each panel, the left hand vial contains untreated simulant and the right hand vial contains treated simulant. Upper left: time=0 minutes after addition of beads; upper right: time=2 minutes; lower left: time=5 minutes; and lower right: vial with thickened material turned on its side at time=5 minutes. Solidification was achieved with a 10:1 ratio of MS to SBC1 and a 5 cc sample of MS.

In the context of this application, 'immobilizing' a chemical agent refers to inducing rheological changes (i.e. thickening) in the agent that make it impractical to deliver the agent, along with, optionally, at least a partial chemical inactivation of the agent. The optional chemical inactivation of the agent is preferably induced by the rheological modifier itself, e.g. through properties inherent in the rheological modifier material or by the linking of reactive materials to the rheological modifier.

In a very preliminary assessment of a binary mixture of RMs, two were evaluated as applied to Malathion, FS-1/SG-1 and PVA/aq.$B_2O_4$ solution. Results suggest that extension to other binary mixtures as well as other simulants or agents is feasible and desirable. The proposed testing program, as outlined by CET, would confirm this possible expansion of a binary approach and its applicability as applied to chemical agents.

TABLE 1

Clean Earth Technologies Laboratory Testing of Simulants with Rheological Modifiers (RM's)

| Wt/vol Sim | Simulant | Wt/vol RM | RM* | Ratio | Description | Gel/Liq |
|---|---|---|---|---|---|---|
| 4.0 cc | CEES | 0.200 g | SBC-1 | 20:1 | Solidification, 1 min | 100/0 |
| 4.0 cc | CEES | 0.400 g | SBC-1 | 10:1 | Solidification, 1 min | 100/0 |
| 4.0 cc | CEES | 0.800 g | SBC-1 | 5:1 | Solidification, 1 min | 100/0 |
| 4.0 cc | CEES | 0.160 g | FS-1 | 25:1 | Thixotropic slurry | 60/40 |
| 4.0 cc | CEES | 0.270 g | FS-1 | 15:1 | Gel in 1 min | 100/0 |
| 0.500 cc | CEES | 0.050 g | SBC-3 | 10:1 | Thixotropic slurry | 95/5 |
| 0.500 cc | CEES | 0.050 g | PEI-3 | 10:1 | Sl. Thickened over tim | 5/95 |
| 0.500 cc | CEES | 0.050 g | SG-1 | 10:1 | 2-phase slurry | 10/90 |
| 5.0 cc | Malathion soln | 0.250 g | SBC-1 | 20:1 | Thixotropic slurry | 30/70 |
| 5.0 cc | Malathion soln | 0.500 g | SBC-1 | 10:1 | Thixotropic slurry | 70/30 |
| 5.0 cc | Malathion soln | 1.00 g | SBC-1 | 5:1 | Solidification, 6 min | 100/0 |
| 5.0 cc | Malathion soln | 0.200 g | FS-1 | 20:1 | Thixotropic slurry | 80/20 |
| 5.0 cc | Malathion soln | 0.333 g | FS-1 | 15:1 | Gel in 3 min | 100/0 |
| 5.0 cc | Malathion soln | 0.500 g | FS-1 | 10:1 | Gel in 1 min | 100/0 |
| 5.0 cc | Malathion soln | 0.100 g | FS-1 | 50:1 | Thixotropic slurry | 50/50 |
|  |  | 0.500 g | SG-1 | 10:1 |  |  |
| 5.0 cc | Malathion soln | 0.500 g | PVA | 10:1 | Thixotropic gel | 70/30 |
|  |  | 0.200 g | Aq $B_2O_4$ | 25:1 |  |  |
| 4.0 cc | NBS | 0.200 g | SBC-1 | 20:1 | Solidification, 2 min | 95/5 |
| 4.0 cc | NBS | 0.400 g | SBC-1 | 10:1 | Solidification, 1 min | 100/0 |
| 4.0 cc | NBS | 0.800 g | SBC-1 | 5:1 | Solidification, 1 min | 100/0 |
| 4.0 cc | NBS | 0.160 g | FS-1 | 25:1 | Thixotropic soln | 10/90 |
| 4.0 cc | NBS | 0.270 g | FS-1 | 15:1 | Clear gel, 1 min | 100/0 |
| 4.0 cc | NPS | 0.200 g | SBC-1 | 20:1 | Solidification, 4 min | 95/5 |
| 4.0 cc | NPS | 0.400 g | SBC-1 | 10:1 | Solidification, 1 min | 100/0 |
| 4.0 cc | NPS | 0.800 g | SBC-1 | 5:1 | Solidification, 1 min | 100/0 |
| 4.0 cc | NPS | 0.160 g | FS-1 | 25:1 | Thixotropic slurry | 50/50 |
| 4.0 cc | NPS | 0.270 g | FS-1 | 15:1 | Solidification, 1 min | 100/0 |
| 4.0 cc | TDG | 0.200 g | SBC-1 | 20:1 | 2-phases flowable | 10/90 |
| 4.0 cc | TDG | 0.400 g | SBC-1 | 10:1 | 2-phases flowable | 80/20 |
| 4.0 cc | TDG | 0.800 g | SBC-1 | 5:1 | Thixotropic soln | 60/40 |
| 4.0 cc | TDG | 0.160 g | FS-1 | 25:1 | Thixotropic gel | 60/40 |
| 4.0 cc | TDG | 0.270 g | FS-1 | 15:1 | Solidification, 1 min | 100/0 |
| 5.0 cc | MS | 0.500 g | SBC-2 | 10:1 | Gel, 2-phases | 60/40 |
| 5.0 cc | MS | 1.00 g | SBC-2 | 5:1 | Thixotropic gel | 95/5 |
| 5.0 cc | MS | 0.500 g | SBC-3 | 10:1 | Gel, 2-phases | 40/60 |
| 5.0 cc | MS | 1.00 g | SBC-3 | 5:1 | Gel, 2-phases | 80/20 |
| 5.0 cc | MS | 0.500 g | SBC-4 | 10:1 | Gel, 2-phases | 30/70 |
| 5.0 cc | MS | 1.00 g | SBC-4 | 5:1 | Gel, 2-phases | 80/20 |
| 5.0 cc | MS | 0.100 g | SBC-1 | 50:1 | Slurry, 2-phases | 20/80 |
| 5.0 cc | MS | 0.200 g | SBC-1 | 25:1 | Slurry, 2-phases | 40/60 |
| 5.0 cc | MS | 0.300 g | SBC-1 | 17:1 | Thixotropic slurry | 60/40 |
| 5.0 cc | MS | 0.500 g | SBC-1 | 10:1 | Solidification, 4 min | 100/0 |
| 5.0 cc | MS | 1.00 g | SBC-1 | 5:1 | Solidification, 3 min | 100/0 |
| 5.0 cc | MS | 0.250 g | FS-1 | 20:1 | Thixotropic gel | 80/20 |
| 5.0 cc | MS | 0.333 g | FS-1 | 15:1 | Solidification, 1 min | 100/0 |
| 5.0 cc | MS | 0.500 g | FS-1 | 10:1 | Solidification, 1 min | 100/0 |
| 5.0 cc | MS | 0.500 g | PEI-1 | 10:1 | 2-phases | 10/90 |
| 5.0 cc | MS | 1.00 g | PEI-1 | 5:1 | 2-phases | 20/80 |

*RMs Evaluated

SBC-1   Cross-linked Styrene/Butadiene Copolymer
SBC-2   Linear Styrene/Butadiene Copolymer
SBC-3   Linear Styrene/Butadiene Copolymer
SBC-4   Linear Styrene/Butadiene Copolymer
FS-1   Fumed Silica
SG-1   Sodium Silicate Solution
DVBS   Divinylbenzene/Styrene Copolymer
PEI-1   Polyethylenimine, low mol wt
PEI-2   Polyethylenimine, high mol wt
PEI-3   50% PEI Aqueous Solution
PVA   Polyvinyl Alcohol
PVP   Polyvinyl Pyrrolidone
PAA   Polyacrylic Acid Polymer
TEOS   Tetraethoxy Orthosilicate
MMA   Methyl Methacrylate Monomer
MCA   Cyano Methoxyacrylate Monomer Simulants Evaluated Mal   Malathon, 50% solution in Xylene
MS   Methyl Salicylate
NBS   Di-n-butyl Sulfide
NPS   Di-n-propyl Sulfide TABLE 1-continued

| Clean Earth Technologies Laboratory Testing of Simulants with Rheological Modifiers (RM's) | |
|---|---|
| TDG | Thiodiglycol |
| CEES | (2-Chloroethyl) Ethyl Sulfide |

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A kit for immobilizing a bulk chemical agent stored in a containment vessel, comprising:

a breaching tool for penetrating the containment vessel;

at least one sealing device for preventing leakage of the bulk chemical agent from the containment vessel during or after breaching;

a rheological modifier stored in a container, wherein the rheological modifier comprises at least one of: fumed silica (FS), polyethylenimine (PEI), cross-linked styrene/butadiene copolymer (SBC1);

wherein the fumed silica has at least one reactive group attached thereto;

a tubulation for delivering the rheological modifier, the tubulation having two ends, wherein a first end is attached to the container and a second end is inserted through the sealing device to gain access to the bulk chemical agent; and a portable, lightweight case for holding the kit.

2. A method for immobilizing at least one hazardous chemical, comprising the steps of:

breaching a container having a bulk chemical agent;

connecting a tubulation to the container in a rotatable manner, wherein the tubulation projects into the container;

adding a rheological modifier into the container using the tubulation; and rotating the tubulation to disperse the rheological modifier within the container so as to promote interaction between the rheological modifier and the bulk chemical agent.

3. The method of claim 2 wherein adding a rheological modifier into the container further comprises:

forcibly inserting the rheological modifier into the container using compressed gas.

4. The method of claim 3 in which the rheological modifier further comprises one or more active ingredients that neutralize the bulk chemical agent such as by reducing the toxicity of the agent.

5. The method of claim 4 wherein the rheological modifier comprises at least one substance selected from the group consisting of: fumed silica (FS), polyethylenimine (PEI), and cross-linked styrene/butadiene copolymer (SBC1).

* * * * *